Sept. 1, 1936.    C. W. LA PIERRE    2,053,154
DIRECT CURRENT INDICATOR
Filed March 27, 1935    4 Sheets-Sheet 2

Inventor:
Cramer W. LaPierre,
by Harry E. Dunham
His Attorney.

Patented Sept. 1, 1936

2,053,154

UNITED STATES PATENT OFFICE 2,053,154

DIRECT-CURRENT INDICATOR

Cramer W. La Pierre, Schenectady, N. Y., assignor to General Electric Company, a corporation of New York Application March 27, 1935, Serial No. 13,273

17 Claims. (Cl. 171—95)

My invention relates to electrical and magnetic indicating, measuring, and controlling methods and devices and concerns particularly arrangements responsive to unidirectional currents or fluxes.

An object of my invention is to provide a sensitive method of detecting the presence of a direct current without the use of instruments such as galvanometers of the ordinary type.

Another object is to provide a self-compensating measuring device.

Still another object is to provide a current or voltage standard which is independent of electrochemical effects or mechanical properties of materials, such as friction and resistance to distortion.

Other and further objects and advantages will become apparent as the description proceeds.

In carrying out my invention in one of its simplest forms, a three-legged core is provided with a direct-current winding on its center leg and with alternating-current supply and output or detecting windings on each of the outer legs. The supply windings are energized by an alternating-current source and are so connected that they act in opposition with respect to the center leg of the core. The core is so designed that it operates with variable permeability. The presence of a direct current in the direct-current winding is then manifested by the appearance of a second harmonic potential in the detector windings.

The features of my invention which are believed to be novel and patentable will be pointed out in the claims appended hereto. A better understanding of the invention may be obtained from the following description taken in connection with the accompanying drawings in which

Figure 1:
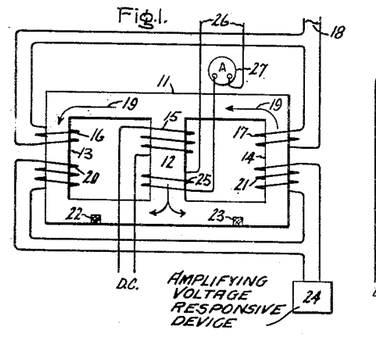
Fig. 1 is a schematic diagram of one embodiment of my invention showing the electrical circuits.

Referring now more in detail to the drawings in which like reference characters are used to designate like parts throughout, in the embodiment of Fig. 1, there is provided a magnetic core 11 having a center leg 12 and outer legs 13 and 14. The center leg 12 carries a direct-current winding 15 and the outer legs 13 and 14 carry alternating-current supply windings 16 and 17, respectively, energized in series by a source of alternating current 18. The supply windings 16 and 17 are so connected that, as indicated by the arrows 19, they aid each other in circulating flux around the long circuit of the core 11 but have opposite polarities with respect to parallel magnetic circuits through the middle leg 12 threading the direct-current winding 15. Alternating-current output or detector windings are provided and are so arranged that they are normally unaffected by fluxes induced by windings 16 and 17. To this end, the detecting windings may be divided into two parts 20 and 21 mounted on outer legs 13 and 14, respectively, of the core 11, and connected to have like polarities with respect to the magnetic circuits through the center leg 12, whereby the fluxes produced by the oppositely connected supply coils 16 and 17 act oppositely in the detecting windings 20 and 21.

The core 11 is composed of variable permeability magnetic material or contains variable permeability inserts in each of the two parallel magnetic circuits which it forms, and the dimensions of the core are preferably such that it operates in the portions of its magnetization curve where variation in permeability is relatively great. The desired effect may also be obtained by partially cutting away the core 11 at 22 and 23. A device 24, which may be any suitable voltage-responsive device, such as, for example, a detector or amplifier of alternating voltage, is connected to the detecting windings 20—21. For the sake of increased sensitivity, the device 24 may be tuned to the second harmonic of the current supplied to the windings 16 and 17.

Figure 9:
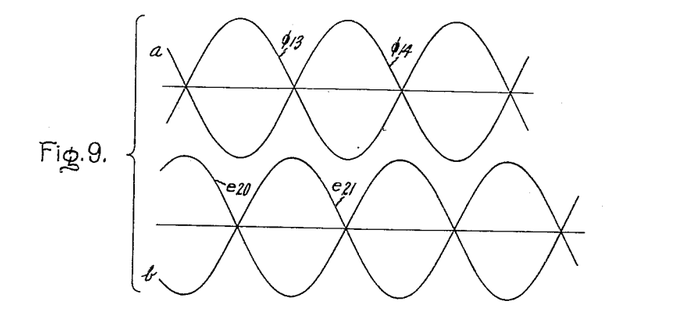
Figs. 9, 10, 11, 12 and 13 are graphs explaining the operation of the apparatus.

The operation of the apparatus depends upon the differential magnetization of the parts of the core 11 by the direct-current winding 15 acting in conjunction with the alternating supply windings 16 and 17. When no current is flowing in the direct-current winding 15 but the supply windings 16 and 17 are connected to the alternating-current source 18, the fluxes produced by the supply windings, represented by curves $\phi_{13}$ and $\phi_{14}$ in Fig. 9, are identical in wave shape and balance each other in their effect upon the detecting windings 20—21. Equal and opposite voltages $e_{20}$ and $e_{21}$ are induced in the windings 20 and 21, and no response is obtained in the device 24. This is true in spite of the variable permeability and reluctance of the core, since the waves are symmetrical although they may not be sinusoidal.

On the other hand, when a direct-current flows in the winding 15, however weak, the flux waves $\phi_{13}$ and $\phi_{14}$ (Figs. 10 and 11) become unsymmetrical and a second harmonic voltage $e_r$ (Fig. 12) appears in the detecting windings 20—21. The phase of the second harmonic voltage reverses when the direction of the direct current is reversed for reasons to be explained hereinafter. The direct current in the winding 15 produces a unidirectional magnetomotive force which aids that of the winding 16 and opposes that of the winding 17 during alternating-current half cycles of a given polarity. During alternating-current half cycles of the opposite polarity, however, the magnetomotive force of winding 16 is opposed and that of winding 17 is aided. As a result, the effect of saturation is alternately diminished and intensified in the core 11 and highly unsymmetrical flux waves are produced in the parallel magnetic circuits of the core 11, the flux wave $\phi_{13}$ in leg 13 being 180 degrees out of phase with that $\phi_{14}$ in leg 14.

Figure 10:
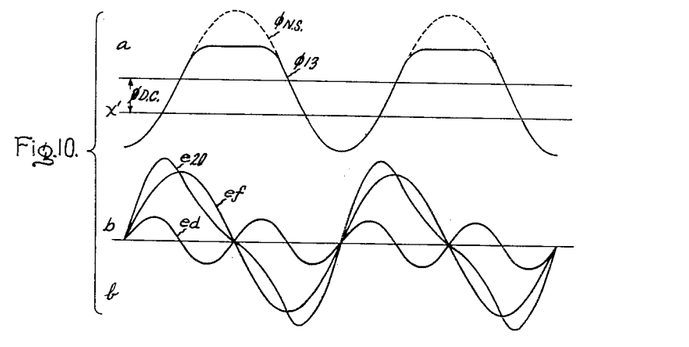
Figure 11:
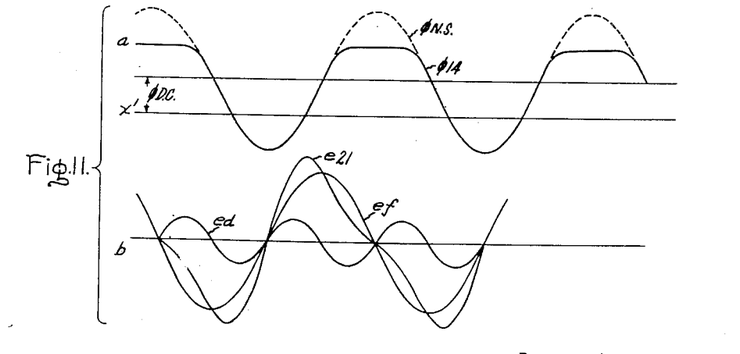

In Figures 10 and 11 $\phi_{DC}$ represents the component of flux produced by the unidirectional magnetomotive force. As a result of saturation, the upper portions of the flux waves $\phi_{13}$ and $\phi_{14}$ are flattened and cannot attain the values represented approximately by the dotted portions $\phi_{NS}$ of the curve which they would attain if there were no saturation of the magnetic core. Of course, every portion of the flux wave is distorted by the effect of unidirectional magnetomotive force but the effect is most marked at the portions of the wave corresponding to the greater values of magnetomotive force, viz., corresponding to the dotted segments $\phi_{NS}$ of the hypothetic flux wave in an unsaturated magnetic material. The waves $e_{20}$ and $e_{21}$ of voltage induced in the windings 20 and 21 by the fluctuating fluxes $\phi_{13}$ and $\phi_{14}$ are also highly unsymmetrical, since the voltage waves represent the instantaneous values of the slopes of the corresponding flux waves.

Unsymmetrical waves are indicative of the presence of even harmonics in the wave, principally the second, it has been found in the present case. Each of the voltage waves $e_{20}$ and $e_{21}$ is shown resolved into its fundamental $e_f$, and its second harmonic, double frequency component, $e_d$. Any higher harmonics are omitted for clearness. Even harmonic components of a wave repeat themselves every half cycle of the fundamental. Consequently, by combining the fluxes produced in the magnetic circuits of legs 13 and 14 or by combining the voltages induced by these fluxes in the windings 20—21, the fundamental and the symmetrical components or odd harmonics of the flux waves are caused to balance each other but the even harmonics are caused to act cumulatively and produce a strong response in the device 24.

Figure 12:
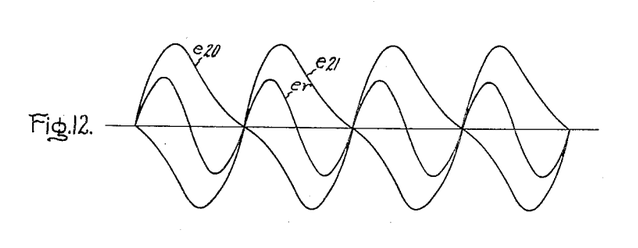

In Fig. 12 is shown the result of adding the two unsymmetrical voltages $e_{20}$ and $e_{21}$. The resultant $e_r$ contains only even harmonics. The reason for this is apparent from an examination of Figures 10 and 11. At every instant, the fundamental $e_f$ in Fig. 10 is equal and opposite to the fundamental $e_f$ in Fig. 11. In a similar manner, if any odd harmonics were shown, these would also be equal and opposite at every instant. The second harmonics $e_d$ in Figs. 10 and 11, however, are in phase and add to produce the resultant $e_r$ of double amplitude shown in Fig. 12. Higher even harmonics than the second would, of course, also act cumulatively.

Figure 13:
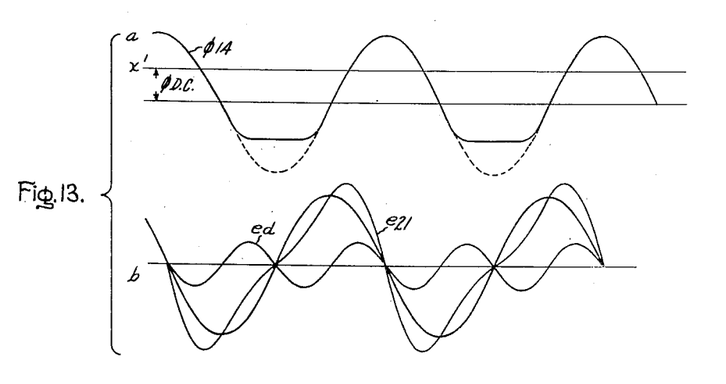

If the polarity of the direct current in the winding 15 is reversed, the phase of the resultant second harmonic, $e_r$, in the detecting windings 20—21 is reversed. This is illustrated in Fig. 13 representing the fluxes and voltages in the leg 14 of the core 11. With the direct-current component of flux $\phi_{DC}$ reversed in direction, the negative half of the flux wave $\phi_{14}$ is the half that is flattened. Consequently, the peaked and flattened portions of the voltage wave $e_{21}$ are in a different order in Fig. 13(b) from that shown in Fig. 11(b) and the double frequency component $e_d$ in Fig. 13(b) has the opposite phase from that shown in Fig. 11(b). A reversal in phase of the second harmonic in winding 20 would, of course, also take place. This reversal in phase of the second harmonic in the detecting windings with reversal in polarity of the direct current in the input winding makes the apparatus responsive to direction as well as strength of the direct current.

Figure 6:
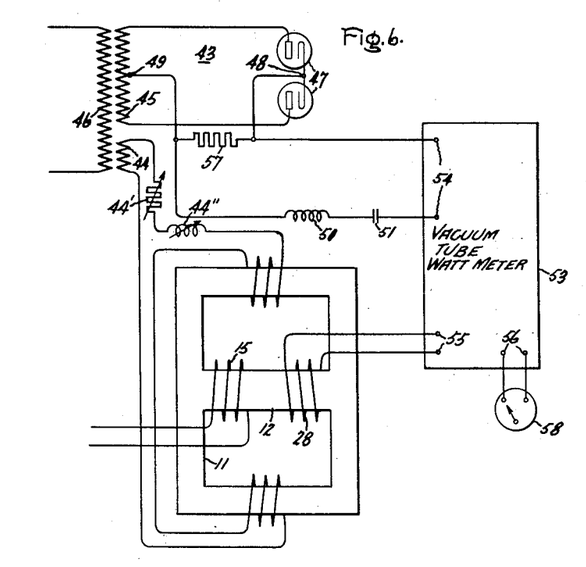
Fig. 6 represents a directional measuring device forming another embodiment of my invention.

Since the second harmonic predominates in the output wave, the apparatus of Fig. 1 will also be found useful in conjunction with other apparatus producing a double frequency wave, for example, in such arrangements as those disclosed in Figs. 5 and 6 which will be described more in detail hereinafter. It will be understood that, when the highest sensitivity is desired, high permeability material is employed in the core 11.

The apparatus of Fig. 1 has thus far been described as a device for merely detecting direct currents. It is apparent, however, that the apparatus may also be used for the measurement of direct currents by suitably calibrating the device 24. The apparatus may, likewise, be arranged to detect or measure deviations from a predetermined value of direct current. In the latter case, a compensating winding 25 energized by an adjustable source of direct current 26 would be provided and the current in the winding 25 would be adjusted to the proper value to neutralize the magnetomotive force of the winding 15 when the predetermined value of current was flowing therein.

The latter arrangement is also of value for measuring direct currents of an order of magnitude either higher or lower than that for which direct-current instruments are readily available. An ammeter 27 of a readily available range is connected in series with the winding 25, and a suitable turn-ratio is chosen for the windings 15 and 25. When the current in the winding 25 has been adjusted to a value producing no response in the device 24, the current flowing in the winding 15 may be determined by reading the ammeter 27 and applying the turn-ratio of windings 25 and 15 as a multiplying factor.

Although I have described an arrangement for combining the effects of the opposite polarity fluxes in the outer legs 13 and 14 of the core by means of detector windings 20 and 21 also on the outer legs, it will be understood that my invention is not limited to this precise arrangement but obviously includes suitable means for combining any of the effects of the differentially affected fluxes, such as induced voltage effects, impedance effects, secondary-current effects, and the like. For example, instead of combining the induced voltages to balance out the symmetrical components by connecting the portions 20 and 21 of the detecting windings in series, I may also combine the fluxes directly in the center leg 12 which is common to both magnetic circuits and place the detecting windings on the center leg 12. Such detecting windings are represented by the coil 28 in Fig. 6. Obviously, the winding 15 may, if desired, serve as both direct-current input winding and detecting winding if the detector 24 is of a type responsive to alternating currents and not subject to interference by direct current. One form of such an arrangement is illustrated in Fig. 8.

Figure 2:
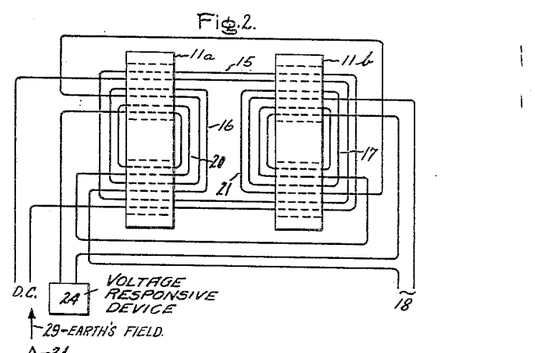
Fig. 2 represents another embodiment of the invention arranged to eliminate effects of residual magnetism.

If the material of which the core 11 is composed has a marked tendency to retain a residual magnetism after being magnetized by a unidirectional flux, difficulty may be encountered from false indications after the direct-current winding 15 has ceased to carry current. Such magnetic materials with residual magnetism may be used without difficulty, however, if the modified core arrangement of Fig. 2 is employed. In this arrangement, two three-legged cores 11a and 11b are utilized, similar in shape to the core illustrated in Fig. 1. However, all the windings are mounted on the center legs. The direct-current winding 15 surrounds the center legs of both cores 11a and 11b. One of the alternating-current supply windings 16 and one of the alternating-current detecting windings 20 are mounted on the center leg of core 11a; and the other supply winding 17 and the other detecting winding 21 are mounted on the core 11b. The detecting windings 20 and 21 are, of course, equivalent to a single coil surrounding the center legs of both cores 11a and 11b, and my invention obviously embraces the latter arrangement. Furthermore, the winding 15 may serve both as direct current input winding and as detecting winding in the manner explained in connection with Fig. 8.

It will be observed that the windings are so connected that the currents at any instant flow in opposite directions in supply windings 16 and 17 but in the same direction in windings 20 and 21. Consequently, as in the arrangement of Fig. 1, at any instant, the effect of a direct current in the winding 15 is to weaken the flux in one magnetic circuit and to strengthen it in the other, producing second-harmonic voltages in the device 24 connected to the windings 20 and 21. Since all parts of the magnetic circuits carry alternating flux, there is substantially no tendency for residual magnetization to persist.

My apparatus may also be used for the detection or measurement of a magnetic flux or a magnetic field, not produced by a current-conducting winding of the apparatus itself. In this case, the center leg 12 of the arrangement of Fig. 1 carrying the unidirectional flux-producing winding 15 is not needed for carrying a flux-producing winding and may be omitted as in Fig. 4. As shown in the arrangement of Fig. 3, whether the center leg 12 is present or not, the magnetic field 29, which is to be detected or measured, serves to make unsymmetrical the alternating flux waves in the arms 13 and 14 of the core 11. It may, however, be advantageous, particularly in the case of a short core such as that illustrated in Fig. 3, to retain the center leg 12 to serve as a return path of lower reluctance than air for the unbalanced flux of the outer legs 13 and 14 while these outer legs are unequally saturated. Needless to say, the detecting winding 20—21 may also be mounted on the center leg 12 as explained in connection with Fig. 1 and illustrated by the substituted winding 28 in Fig. 6, instead of on the outer legs 13 and 14. If desired, a compensating winding 30, adapted to carry an adjustable direct current, may be added surrounding both arms 13 and 14 of the core 11. The magnitude of the current in the winding 30 required to overcome the field 29 and produce null response in the device 24 then serves as a measure of the strength of the field 29.

Figures 3, 4, 5, 8:
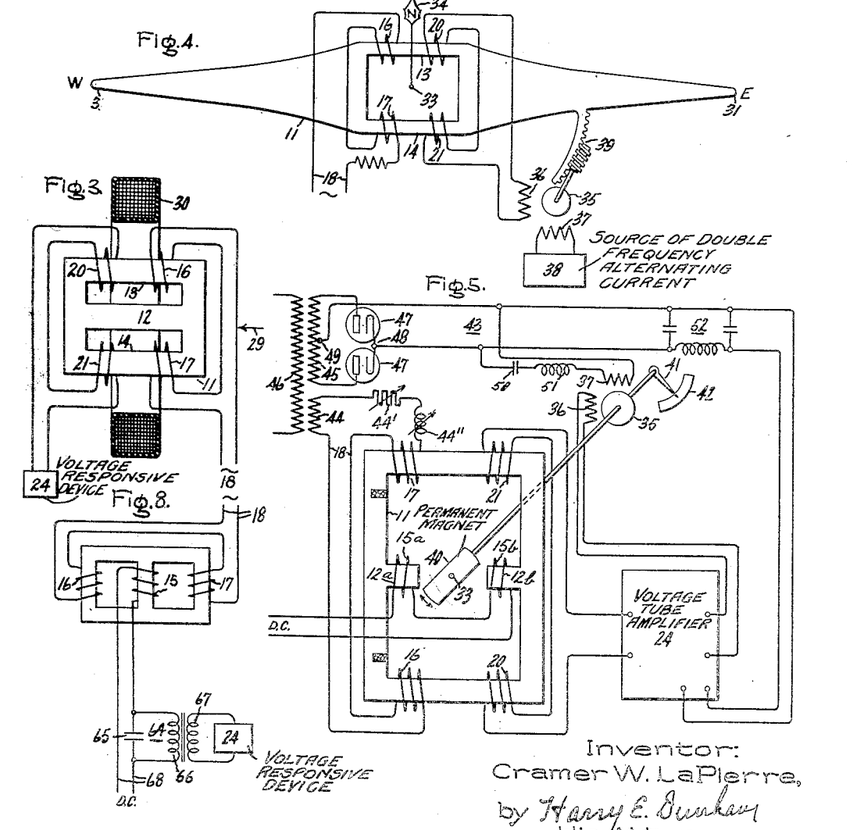
Fig. 3 represents an embodiment of the invention suitable for use as a flux meter.
Fig. 4 represents a modification of the arrangement of Fig. 3 for use as a compass.
Fig. 5 represents another embodiment of my invention including the feature of automatic compensation.
Fig. 8 represents an embodiment in which a single winding serves for the direct current input and the second harmonic output.

The arrangement of Fig. 3 without the compensating coil 30 may be used as a compass by mounting the core 11 rotatably on a vertical axis and finding the position at which the response in the device 24 is reduced to zero. The sensitivity of the device as a compass may be greatly augmented by longitudinally extending the portions of the core 11, which connect the arms 13 and 14, to form the east and west indicating wings 31 and 32 as shown in Fig. 4. When using the device as an indicating compass, the core 11 is mounted to permit rotation about a vertical pivot axis 33 and a compass rose (not shown) or a north pointer 34 alone is attached to the core 11 for rotation therewith. It will be understood that suitable sliding or flexible connections are provided for the windings 16, 17, 20, 21 to permit rotation of the core 11.

By combining the compass with an orienting motor mechanism of the type which will be described more in detail in connection with Fig. 5, the compass may be made self-orienting or may also be used for automatic steering. The orienting mechanism consists of a two-phase motor 35 having a field winding 36 of one phase connected to the detecting winding 20—21 of the compass and a field winding 37 of another phase connected to a source 38 of alternating currents which is double the frequency of source 18 and in quadrature with the currents which are induced in the winding 20—21 when the flux-collecting wings 31 and 32 deviate from perpendicularity to the earth's field 29. Suitable gearing 39 to which the motor 35 is connected is provided to permit the motor to maintain the core 11 properly oriented. As soon as the position of orientation is reached, the current in the field winding 36 drops to zero and the motor stops.

In the case of an indicating compass, the gearing 39 is directly connected to the core 11, but, of course, in the case of automatic steering apparatus, the gearing is connected to the steering mechanism or the control for the steering mechanism of the marine or air-craft on which the apparatus is employed. In the latter case, the core 11 is set by the navigator at the proper angle to the fore-and-aft line of the craft, depending upon the course to be steered, and the motor corrects deviations from the course by bringing the vessel around to the position for which the earth's field induces no flux in the arms 13 and 14 of the core 11.

In connection with Figs. 1 and 3, I have described the use of compensating current-conducting coils when making certain measurements of unidirectional current and magnetic field, respectively. It will be understood, however, that my invention is not limited to this precise arrangement but obviously includes the use of any suitable compensating arrangement. For example, a permanent magnet may be employed for adjustably compensating the measured direct current flowing in the winding 15, the adjustment being obtained by varying the distance between the permanent magnet poles and the core 11 or by varying their relative angular position. The compensating permanent magnet may be either external to or internal to the core 11.

In Fig. 5, a compensating permanent magnet 40 is shown mounted within the core 11. To receive the permanent magnet 40, a gap has been left in the center leg 12, dividing it into two parts, a and b. The core 11 and the magnet 40 are arranged to permit relative rotation about an axis 33, the core 11 being preferably a stationary member. The direct-current winding 15 is also preferably divided into two parts, a and b. The effect of the permanent magnet 40 upon the flux in the core 11 will depend upon the relative angular positions. Accordingly, the polarity and strength of current in the winding 15a—15b which will be compensated by the permanent magnet 40 will also depend upon its angular position with respect to the core 11. For this reason, if desired, there may be provided a pointer 41, attached to the compensating magnet 40 and a scale 42 attached to the core 11 and cooperating with the pointer 41 to permit reading the value of the current in the winding 15a—15b. To make a measurement, the compensating magnet 40 is moved to such a position that the double frequency voltage induced in the winding 20—21 and detected by device 24 falls to zero. Inasmuch as permanent magnets may be made which retain their strength with a high degree of permanency, the apparatus may be employed as a current or voltage standard. Thus are avoided the uncertainties due to electrochemical effects in standard cells or the uncertainties due to variation in biasing spring restraining torque in secondary standards of the deflecting galvanometer type. Furthermore, the accuracy is not impaired by failure to complete a reading promptly.

The apparatus may be made self-compensating by connecting to the compensating magnet 40 a motor 35 actuated by the double-frequency output from the detecting winding 20—21. Any suitable type of motor may be employed. For the sake of illustration, I have shown in the drawing an induction motor of the induction disc type. To facilitate obtaining a directional response in the motor, I prefer to use one of the polyphase type. The motor 35 is provided with two field windings 36 and 37 in space quadrature fed by currents displaced in phase relation. One of the windings 36 is fed by the detecting winding 20—21 preferably through an amplifier 24 which may be of any desired type, such as a vacuum tube amplifier, for example. The other field winding 37 may be fed by a double-frequency source of any desired type.

For the sake of compactness, the double-frequency currents for winding 37 may be obtained by making a suitable connection to a biphase rectifier 43, which may already be in use for supplying filtered direct current to the vacuum tube amplifier 24 or for other purposes. To insure the proper phase relationship between the voltages supplied to windings 36 and 37 and identity of frequency, the supply windings 16 and 17 and the biphase rectifier 43 are energized by transformer secondary windings 44 and 45, respectively, cooperating with a common primary winding 46 connected to a suitable alternating-current circuit.

The biphase rectifier 43 is of a well known type, not constituting a part of my invention, and consists of a pair of rectifier elements 47, such as rectifying discharge tubes, having one pair of like electrodes connected together and the other pair of like electrodes connected to the transformer secondary winding 45. The output connection is made between the common terminal 48 of tubes 47 and the midpoint 49 of winding 45. The voltage appearing between 48 and 49 is unidirectional but fluctuates with double frequency owing to the fact that the negative loops of the sine wave in winding 45 have been reversed. The winding 37 of motor 35 is connected to the points 48 and 49 in series with a condenser 50 and an inductor 51 of such dimensions as to tune the circuit of field winding 37 to the double frequency. This connection to the motor in no way interferes with the operation of the device 43 as a source of filtered direct current but, in fact, improves the operation. The tuned field circuit tends to absorb the double-frequency alternating component of the fluctuating voltage between 48 and 49 and, therefore, reduces the capacity of the filter 52 required to smooth out the direct voltage output to a predetermined degree. The condenser 50, of course, prevents the flow of any direct current in the winding 37.

The double-frequency voltages applied to windings 36 and 37 tend to be out of phase, and, as already mentioned, the voltage induced in detecting winding 20—21 reverses or changes 180 degrees in phase whenever the direction of unidirectional flux in the center leg 12 of the core 11 reverses. Consequently, the motor 35 may be so connected as to operate the compensating device 40 in whichever direction is required to cause a balance to be obtained, and, when the device is in balance, the voltage in the winding 36 will fall to zero and cause the motor 35 to remain at standstill.

Owing to unavoidable factors such as hysteresis loss, the voltages applied to windings 36 and 37 may not actually be in quadrature when the voltages applied in windings 16, 17, and 45 are in phase. The voltages at 36 and 37 may be brought into quadrature, however, to obtain maximum efficiency of the motor 35 by employing suitable phase-shifting means. An adjustable phase shifter may be interposed between one of the windings of the motor 35 and the input to the winding or between the primary source of alternating-current power and either the rectifier-frequency multiplier 43 or the alternating-current input windings 16 and 17 of the current detector 11. For example, an adjustable impedance may be connected in series with the windings 16 and 17 to permit varying at will the phase relationship between the current therein and the voltage supplied by the winding 44. Such an impedance is shown divided into two adjustable portions 44', resistance, and 44'', inductive or condensive reactance, to permit varying the ratio of reactance to resistance without necessarily varying the input current. Since the frequency of the current in the winding 36 is double that in the windings 16 and 17, a shift in primary current through a given angle by the phase shifter 44'—44'' results in a shift through double that angle in the winding 36.

While I have described my self-compensating feature in connection with a compensating permanent magnet, it will be understood that the invention is not limited to this precise arrangement but obviously includes connecting the double-frequency responsive device to adjust compensating means of whatever type may be employed. It is evident that the position at which the motor 35 comes to rest is independent of the voltage and frequency of the alternating-current supply circuit.

The motor 35, shown in Fig. 5, is analogous to a reactive watt-hour meter mechanism. In certain cases, rotation may not be necessary or desirable and, in such cases, one may substitute a device analogous to an indicating wattmeter or reactive volt-ampere meter for the motor 35. To obtain high sensitivity, preferably an instrument of the vacuum type is employed. Such an arrangement is illustrated in Fig. 6 in which the rectangle 53 represents a vacuum tube wattmeter 53 of the type illustrated and described in United States Patent No. 1,869,209, granted July 26, 1932, to Milton S. Mead and assigned to the same assignee as the present application. Since the employment of a particular type of wattmeter is not essential to my invention, the vacuum tube wattmeter 53 need not be described further than to say; that it possesses two pairs of input terminals 54 and 55 and a pair of output terminals 56; that, when operating the device 53 as a wattmeter, potentials are applied to the terminal pairs 54 and 55 proportional to the current and to the voltage, respectively, or vice versa, in a circuit the power of which is to be measured; and that a direct current may be drawn from the terminals 56 proportional to the vector product of the potentials applied at the terminal pairs 54 and 55, and dependent in direction upon the phase relationship between the applied potentials.

The terminals 55 are connected to a second harmonic detecting winding 28 which may, as shown, be mounted upon the center leg 12 of coil 11 instead of being divided between the outer legs 13 and 14, as shown at 20 and 21 in Fig. 1. As explained in connection with Fig. 5, the second harmonic output voltages of the saturating core device 11 and the double frequency source 43 normally tend to be out of phase. Accordingly, a phase-shifter is interposed in a suitable portion of the circuit in order to bring the potentials applied to the wattmeter into phase alignment and permit it to operate as a wattmeter. If desired, an adjustable phase-shifter 44'—44" may be employed, which is arranged in the manner described in connection with Fig. 5, except that it is adjusted to bring the voltages at 54 and 55 in phase instead of in quadrature. The resistor 57 may represent a direct current load for the device 43 or simply a by-pass for any direct currents therein. A suitable current-responsive device 58 is connected to the output terminals 56 of the wattmeter 53 and may take the form, for example, of an indicating instrument or a compensating winding, as shown at 25 in Fig. 1, depending upon the purpose of the apparatus. The presence of a weak direct current in the winding 15 of the core 11 results in an amplified response at terminals 56 of the wattmeter 53 dependent in direction upon the direction of the current in the winding 15.

Figure 7:
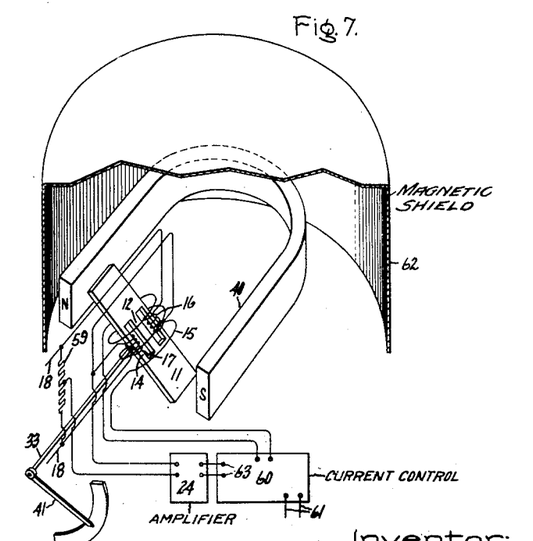
Fig. 7 represents a modification of Fig. 5 arranged as a current standardizer.

In Fig. 7 is illustrated in part a modification of the arrangement of Fig. 5 in which the three-legged core 11 is made movable instead of the compensating magnet. In this form of the invention, the compensating magnet 40 may be of the horseshoe type. The core 11 is preferably composed of laminations of highly permeable material arranged to form a light vane mounted for rotation on a shaft 33 between the pole pieces of the magnet 40. Instead of employing a separate second-harmonic detecting winding or windings such as the windings 20 and 21 of the other figures, I may connect taps to the alternating-current supply windings 16 and 17 in such a manner that a second-harmonic voltage is produced between the taps in response to any unbalance between the effect of the direct-current winding 15 and the compensating magnet 40. For example, I may connect a potential divider 59 across the alternating-current supply 18 and connect the second-harmonic detector or amplifier between the midpoint of the potential divider 59 and the common terminal of the windings 16 and 17. The apparatus may otherwise be arranged as shown in Fig. 5.

If it is desired to arrange the apparatus to produce a standard current which may be varied in accordance with the setting of the pointer 41, the compensating motor arrangement 35 of Fig. 5 may be omitted and the output of the amplifier 24 may be connected to the control terminals 63 of a current controller 60 of any desired type, but preferably of the vacuum tube type energized by a current source 61 and arranged to produce a direct current varying in accordance with variations in voltage between or current through its control terminals 63.

In order to produce a standard current of a desired value, the vane 11 is rotated until the pointer 41 is brought opposite a scale division on the scale 42 corresponding to the desired current. Since the vane 11 is rotated away from its previously compensated position, a second-harmonic voltage will be produced corresponding to the unbalance. However, this second-harmonic voltage will act through the amplifier 24 on the current regulator 60 to vary the current flowing through the winding 15 until the effect of the winding 15 and the field produced by the compensating magnet 40 are again balanced. It will be understood that the scale 42 must be calibrated experimentally.

In order to guard against stray fields from other electrical apparatus or the effect of the earth's magnetism, the compensating magnet 40 and the rotating vane 11 are preferably encased in a covered cylindrical shield 62 of soft iron or any other suitable magnetic material.

Fig. 8 illustrates one arrangement for utilizing the direct-current input winding 15 as a second harmonic detecting winding as well. In this case, a filter 64 tuned to the frequency of the second harmonic is connected in series with the direct-current winding 15 and the direct-current input terminals 68 to prevent second harmonic currents or voltages appearing in whatever apparatus may supply the direct-current input to be measured or detected. The filter 64 may consist, for example, of a condenser 65 and an inductance 66 connected in parallel. A winding 67 is provided in inductive relation with the inductance 66 and is connected to an amplifier 24 or other suitable device to respond to second harmonic currents circulating in the resonant circuit provided by the filter 64.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. In combination, a winding adapted to carry a direct current, means including portions composed of variable permeability magnetic material providing a pair of magnetic circuits linking said winding, an alternating-current supply winding linking one of said magnetic circuits, a second alternating-current supply winding linking the other of said circuits, said alternating-current windings being connected in series to have opposite polarities with respect to the magnetic circuits through said direct-current winding, an alternating-current output winding linking said magnetic circuits, and an electrical instrument connected to said output winding.

2. In combination, a core composed of magnetic material having three legs, a direct-current winding mounted on the center leg, an alternating-current supply winding on one of the outer legs, and a second alternating-current supply winding on the other outer leg in series with said first mentioned winding, said alternating-current windings having opposite polarities with respect to the magnetic circuits through said center leg, an alternating-current output winding on one of said outer legs, and a second alternating-current output winding on the other of said outer legs in series with said first mentioned output winding, said output windings having like polarities.

3. A unidirectional magnetic field indicator comprising in combination, magnetic core means providing a pair of parallel magnetic circuits composed of variable permeability magnetic material and adapted to be subjected to a magnetic field to be detected, alternating-current supply windings connected in series-opposition, one linking one of said parallel magnetic circuits and the other linking the other of said parallel magnetic circuits, an alternating-current detector winding linking said magnetic circuits and an electrical instrument connected to said detector winding.

4. A direct-current indicator comprising in combination, a direct-current winding, means including portions composed of variable permeability magnetic material providing a pair of magnetic circuits linking said winding, a source of alternating current, an alternating-current supply winding linking one of said magnetic circuits, a second alternating-current supply winding linking the other of said magnetic circuits, said alternating-current windings being connected to said current source in series to have opposite polarities with respect to the magnetic circuits through said direct-current winding, an alternating-current output winding linking said magnetic circuits, and a device connected to said output winding selectively responsive to currents of twice the frequency of said supply source.

5. In combination, magnetic core means providing a pair of magnetic circuits composed of variable permeability magnetic material, a winding linking both of said magnetic circuits and adapted to carry a direct current to be measured, alternating-current supply windings, one linking one of said circuits and the other linking the other of said circuits and being connected to have opposite polarities with respect to said circuits, whereby the core material of said circuits is acted upon differentially by the currents in said alternating-current and direct-current windings, means for combining the effects produced in said magnetic circuits, and means for detecting the resultant of the combined effects.

6. A device responsive to a unidirectional magnetic field comprising in combination, magnetic core means providing a pair of parallel magnetic circuits composed of variable permeability magnetic material adapted to be subjected to a magnetic field to be detected, alternating-current supply windings, one linking one of said circuits and the other linking the other of said circuits and being connected to have opposite polarities with respect to said circuits, whereby the core material of said circuits is acted upon differentially by the magnetic field to be detected and the currents in said alternating-current windings, means for combining the effects produced in said magnetic circuits, and means for detecting the resultant of the combined effects.

7. A magnetic compass comprising in combination, a core having a pair of magnetically parallel members joining two longitudinally extending wings, alternating-current supply windings on said parallel members connected to act in opposition with respect to said magnetic wings, and an alternating-current detecting winding linking said members, whereby the earth's field combines with the effect of said supply windings to produce an unsymmetrical flux wave and a response in said detecting winding only when said wings depart from perpendicularity with the earth's field.

8. An orienting device comprising in combination, a magnetic core horizontally movable with respect to the earth's field, said core having two magnetically parallel members joining two longitudinally extending wings adapted to direct a part of the earth's field through said parallel members when said wings depart from perpendicularity to the direction of the earth's field, alternating-current supply windings on said parallel members connected to act in opposition with respect to said wings, an alternating-current detecting winding linking said members, and electric motor means connected to said detecting winding for bringing said core into perpendicularity to the earth's field in response to voltage induced in said detecting winding.

9. An orienting device comprising in combination, a magnetic core horizontally movable with respect to the earth's magnetic field, said core having magnetically parallel members joining two longitudinally extending wings adapted to direct a part of the earth's field through said parallel members when said wings depart from perpendicularity to the direction of the earth's field, alternating-current supply windings on said parallel members connected to act in opposition with respect to said wings, a source of alternating current connected to said windings, an alternating-current detecting winding linking said parallel magnetic members, a source of double-frequency alternating current, a polyphase motor arranged to bring said core into perpendicularity to the earth's field having windings of one phase connected to said detecting winding and windings of another phase connected to said double-frequency source.

10. A direct-current responsive device comprising in combination, a magnet and a magnetic core relatively movable with respect to each other, said core including portions composed of variable permeability magnetic material providing a pair of magnetic circuits, a direct-current winding linking said circuits, an alternating-current supply winding linking one of said circuits, a second alternating-current supply winding linking the other of said circuits, said alternating-current windings being connected to act in opposition with respect to the magnetic circuits through said direct-current winding, and an alternating-current detecting winding linking said magnetic circuit, said magnet being in inductive relaton with said magnetc circuits, whereby said magnet and said direct-current winding act in conjunction and variations in direct current may be compensated in effect upon said core by relative motion between said core and said magnet.

11. A direct current responsive device comprising in combination, a magnet and a magnetic core relatively movable with respect to each other, said core including portions composed of variable permeability magnetic material providing a pair of magnetic circuits, a direct-current winding linking said circuits, an alternating-current supply winding linking one of said circuits, a second alternating-current supply winding linking the other of said circuits, said alternating-current windings being connected to act in opposition with respect to the magnetic circuits through said direct-current winding, whereby the core material of said circuits is acted upon differentially by the currents in said alternating-current and direct-current windings, means for combining the effects produced in said magnetic circuits, and means for detecting the resultant of the combined effects, said magnet being in inductive relation with said magnetic circuits, whereby said magnet and said direct-current winding act in conjunction and variations in direct current may be compensated in effect upon said core by relative motion between said core and said magnet.

12. A direct-current responsive device comprising in combination, a magnet and a magnetic core relatively movable with respect to each other, said core having a center leg with an air gap therein and two outer legs, a direct-current winding linking said center leg, an alternating-current supply winding on one of the outer legs, a second alternating-current supply winding on the other of the outer legs, said alternating-current windings being connected to act in opposition with respect to the magnetic circuit through said center leg, and an alternating-current detecting winding linking magnetic circuits through both of said outer legs, said magnet being mounted in said air gap with an axis of rotation perpendicular to the direction of the magnetomotive force of said magnet and perpendicular to the direction of the flux through said air gap, whereby said magnet and said direct-current winding act in conjunction and variations in direct current may be compensated in effect upon said core by relative rotation between said core and said magnet.

13. A direct-current responsive device comprising in combination a magnet and a magnetic core relatively movable with respect to each other, said core including portions composed of variable permeability magnetic material providing a pair of magnetic circuits, a direct-current winding linking said circuits, an alternating-current supply winding linking one of said circuits, a second alternating-current supply winding linking the other of said circuits, a source of alternating current so connected to said windings that they act in opposition with respect to the magnetic circuits through said direct-current winding, an alternating-current detecting winding linking said magnetic circuits, and electric motor means for varying the relative position of said magnet in said core energized in response to voltage induced in said detecting winding, said magnet being in inductive relation with said magnetic circuits whereby said magnet and said direct-current winding act in conjunction and variations in direct current are compensated in effect upon said core by relative motion between said core and said magnet until the voltage in said detecting winding drops to zero and said motor stops.

14. A direct-current responsive device comprising in combination, a magnet and a magnetic core relatively movable with respect to each other, said core including portions composed of a variable permeability magnetic material providing a pair of magnetic circuits, a direct-current winding linking said circuits, an alternating-current supply winding linking one of said circuits, a second alternatng-current supply winding linking the other of said circuits, a source of alternating current so connected to said windings as to act in opposition with respect to the magnetic circuits through said direct-current winding, whereby the core material of said circuits is acted upon differentially by the currents in said alternating-current and direct-current windings, means for combining the effects produced in said magnetic circuits and producing a voltage representing the combined effect, and electric motor means connected thereto for varying the relative position of said magnet and said core, said motor means being energized in response to the voltage representing the combined effects in said magnetic circuits, said magnet being in inductive relation with said magnetic circuits, whereby said magnet and said direct-current winding act in conjunction and variations in direct current are compensated in effect upon said core by relative motion between said core and said magnet until the voltage in said combining means drops to zero and said motor stops.

15. A direct-current responsive device comprising in combination, a winding adapted to carry a direct current, means including portions composed of variable permeability magnetic material providing a pair of magnetic circuits linking said winding, an alternating-current supply winding linking one of said magnetic circuits, a second alternating-current supply winding linking the other of said circuits, a source of alternating current so connected to said supply windings that they act in opposition with respect to the magnetic circuits through said direct-current winding, an alternating-current detecting winding linking said magnetic circuits, a source of double-frequency alternating current, and a wattmeter type instrument having one pair of input terminals connected to said double-frequency source and a second pair of input terminals connected to said detecting winding.

16. A current standardizer comprising in combination, a direct-current responsive magnetic core device having a direct-current winding in inductive relation therewith and having alternating-current output terminals in which a voltage is induced in response to unidirectional flux in said core, a compensating permanent magnet, said core and said magnet being relatively movable to permit balancing the inductive effect of the field of said magnet and the field of said direct-current winding on said core, a source of current, a current controller having direct-current output terminals supplying said direct-current winding and having control terminals, the voltage across which serves to regulate the current supplied by said current controller, and an amplifier interposed between the alternating-current output terminals of said current responsive core device and the control terminals of said current controller, whereby setting the core and the compensating magnet in a predetermined relative position causes the flux through said core to be varied until said current controller is regulated to adjust the direct current in said winding to correspond to the relative position between said core and said compensating magnet.

17. Apparatus responsive to direct current comprising in combination, magnetic core means providing a pair of magnetic circuits composed of variable permeability magnetic material, input terminals adapted to carry a direct current to be measured, connected to said terminals, a winding linking both of said magnetic circuits, a source of alternating current, connected thereto, alternating-current supply windings, one linking one of said magnetic circuits and the other linking the other of said circuits and being connected to have opposite polarities with respect to said circuits, whereby the core material of said circuits is acted upon differentially by the currents in said alternating-current and direct-current windings, a filter interposed between said input terminals and said direct-current winding to block alternating currents having a frequency twice that of said alternating current source, and means responsive to double frequency currents in said filter.

CRAMER W. LA PIERRE.